(12) United States Patent
Park et al.

(10) Patent No.: US 8,435,481 B2
(45) Date of Patent: May 7, 2013

(54) MATERIAL FOR SOLID OXIDE FUEL CELL, CATHODE INCLUDING THE MATERIAL, AND SOLID OXIDE FUEL CELL INCLUDING THE MATERIAL

(75) Inventors: Hee-jung Park, Suwon-si (KR); Chan Kwak, Yongin-si (KR)

(73) Assignees: Samsung Electronics Co., Ltd. (KR); Samsung Electro-Mechanics Co., Ltd. (KR)

( * ) Notice: Subject to any disclaimer, the term of this patent is extended or adjusted under 35 U.S.C. 154(b) by 230 days.

(21) Appl. No.: 13/010,351

(22) Filed: Jan. 20, 2011

(65) Prior Publication Data
US 2012/0064433 A1  Mar. 15, 2012

(30) Foreign Application Priority Data
Sep. 14, 2010  (KR) .................. 10-2010-0089921

(51) Int. Cl.
*C01B 13/14* (2006.01)
*H01M 4/36* (2006.01)

(52) U.S. Cl.
USPC .................... 423/592.1; 429/482; 429/484

(58) Field of Classification Search ............. 423/592.1
See application file for complete search history.

(56) References Cited

U.S. PATENT DOCUMENTS

| 5,350,641 | A  | 9/1994  | Mogensen et al. |
| 5,629,103 | A  | 5/1997  | Wersing et al. |
| 6,803,141 | B2 | 10/2004 | Pham et al. |
| 2007/0275292 | A1 | 11/2007 | Sin Xicola et al. |

FOREIGN PATENT DOCUMENTS

| JP | 2006-321706 A | 11/2006 |
| JP | 2009-152014 A | 7/2009 |

OTHER PUBLICATIONS

Huang, Feasibility of simultaneous NO reduction and electricity generation in SOFCs with V2O5 or Cu added LSCF-GDC cathodes, Electrochemistry Communications 11 (2009), 477-480.*

* cited by examiner

*Primary Examiner* — Cynthia Lee
(74) *Attorney, Agent, or Firm* — Cantor Colburn LLP

(57) ABSTRACT

A material for a solid oxide fuel cell, the material including a lanthanum metal oxide having a perovskite-type crystal structure; and a ceria metal oxide, wherein the ceria metal oxide includes at least one material selected from the group consisting of metal oxides represented by Formula 1 below and metal oxides represented by Formula 2:

$(1-a-b)Ce_{1-x}A_xO_{2-\delta} + aB_2O_5 + bBO_3$  Formula 1

$Ce_{1-x-y}A_xB_yO_{2-\gamma}$  Formula 2 wherein $0 \leq a \leq 0.01$, $0 \leq b \leq 0.02$, $0 < 2a+ \leq 0.02$, $0 < x < 0.3$, $0 < y \leq 0.02$, $\delta$ and $\gamma$ are selected so that the metal oxides of Formulas 1 and 2, respectively, are both electrically neutral, A is a rare earth metal, and B is a 5-valent metal or a 6-valent metal.

14 Claims, 6 Drawing Sheets

MATERIAL FOR SOLID OXIDE FUEL CELL, CATHODE INCLUDING THE MATERIAL, AND SOLID OXIDE FUEL CELL INCLUDING THE MATERIAL

CROSS REFERENCE TO RELATED APPLICATIONS

This application claims priority to Korean Patent Application No. 10-2010-0089921, filed on Sep. 14, 2010, and all the benefits accruing therefrom under 35 U.S.C. §119, the content of which in its entirety is herein incorporated by reference.

BACKGROUND

1. Field

The present disclosure relates to a material for a solid oxide fuel cell, a cathode including the material, and a solid oxide fuel cell including the material.

2. Description of the Related Art

Solid oxide fuel cells ("SOFCs") are an environmentally friendly and highly efficient electrochemical power generation technology that directly converts chemical energy of a fuel gas into electrical energy. SOFCs use relatively inexpensive materials compared to other types of fuel cells, have a relatively high tolerance to fuel impurities, provide hybrid power generation capability, and have high efficiency. In addition, in SOFCs, direct use of hydrocarbon fuels is possible without reforming the fuel into hydrogen. This direct use of hydrocarbon fuels may lead to simplification of a fuel cell system and low manufacturing costs. A SOFC includes an anode at which a fuel, such as hydrogen or hydrocarbon, is oxidized, a cathode at which oxygen gas is reduced to oxygen ions ($O^{2-}$), and a ceramic solid electrolyte for conducting the oxygen ions.

Because SOFCs are operated at a temperature of 800 to 1,000° C., high-temperature alloys or expensive ceramic materials, which are capable of enduring high temperature conditions, are desirably used. SOFCs have a long initial driving time, and when they are operated for a long time, durability thereof may be degraded. In addition, SOFCs have high manufacturing costs, which is a significant obstacle for commercialization.

Thus, it would be desirable to reduce the operating temperature of SOFCs to 800° C. or lower. However, a decrease in the operating temperature may result in a significant increase in electrical resistance of a cathode material of the SOFC, ultimately resulting in a reduction of SOFC power density. As described above, because a decrease in the operating temperature of an SOFC is dependent upon the magnitude of cathode resistance, much worldwide effort is being made to reduce cathode resistance.

SUMMARY

Provided is a material for a solid oxide fuel cell which includes a ceria containing ion conductor including a 5-valent metal and/or a 6-valent metal and a lanthanum electron conductor.

Provided is a cathode for a solid oxide fuel cell, in which the cathode includes the material.

Provided is a solid oxide fuel cell including the material.

Additional aspects will be set forth in part in the description which follows and, in part, will be apparent from the description.

According to an aspect, a material for a solid oxide fuel cell includes: a lanthanum metal oxide having a perovskite-type crystal structure; and a ceria metal oxide, wherein the ceria metal oxide includes at least one material selected from the group consisting of metal oxides represented by Formula 1 below and metal oxides represented by Formula 2 below:

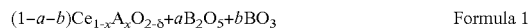

$$(1-a-b)Ce_{1-x}A_xO_{2-\delta}+aB_2O_5+bBO_3 \quad \text{Formula 1}$$

$$Ce_{1-x-y}A_xB_yO_{2-\gamma} \quad \text{Formula 2}$$

wherein $0 \leq a \leq 0.01$, $0 \leq b \leq 0.02$, $0 < 2a+b \leq 0.02$, $0 < x < 0.3$, $0 < y \leq 0.02$, 'δ' and 'γ' are selected so that the metal oxides of Formulas 1 and 2, respectively, are both electrically neutral, A is a rare earth metal, and B is a 5-valent metal or a 6-valent metal.

The lanthanum metal oxide may include a lanthanum transition metal oxide doped with an alkaline earth metal.

The alkaline earth metal-doped lanthanum transition metal oxide may include two or more different transition metals.

The lanthanum metal oxide may include strontium (Sr)- and iron (Fe)-doped $LaCoO_3$.

In the material described above, A may be lanthanum (La), neodymium (Nd), samarium (Sm), gadolinium (Gd), or yttrium (Y), or a combination including at least one of the foregoing.

In the material described above, B may be tantalum (Ta), niobium (Nb), vanadium (V), or tungsten (W), or a combination including at least one of the foregoing.

An amount of the lanthanum metal oxide having a perovskite-type crystal structure may be in a range of about 20 to about 80 parts by weight, based on 100 parts by weight of the ceria metal oxide.

According to another aspect, a cathode for a solid oxide fuel cell includes the material described above.

The cathode may have a multi-layer structure including the material described above, and an additional layer, wherein the additional layer includes a lanthanum metal oxide having a perovskite-type crystal structure.

According to another aspect, a solid oxide fuel cell includes the cathode described above; an anode; and an electrolyte interposed between the cathode and the anode.

The solid oxide fuel cell may further include a first functional layer disposed between the cathode and the electrolyte, wherein the first functional layer prevents or suppresses a reaction between the cathode and the electrolyte.

The first functional layer may include at least one material selected from the group consisting of gadolinium doped ceria ("GDC"), samarium doped ceria ("SDC"), and yttrium doped ceria ("YDC").

According to another aspect a solid oxide fuel cell includes: a cathode; an anode; an electrolyte interposed between the cathode and the anode; and a second functional layer which is interposed between the cathode and the electrolyte, wherein the second functional layer includes the material described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
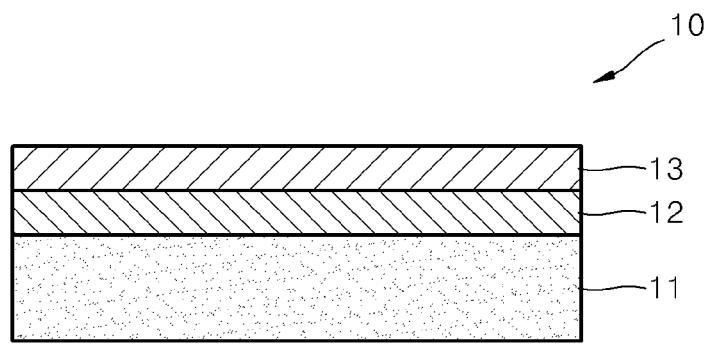
FIG. 1 is a cross-sectional view of an embodiment of a half cell including a layer of a material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A material for a solid oxide fuel cell according to an embodiment will now be disclosed in further detail.

A material for a solid oxide fuel cell according to an embodiment includes a lanthanum metal oxide having a perovskite-type crystal structure and a ceria metal oxide. The term 'a material for a solid oxide fuel cell' as used herein may also refer to 'a cathode material for a solid oxide fuel cell' and/or 'a functional layer material for a solid oxide fuel cell,' and may refer to a mixture, slurry, and/or composite including the lanthanum metal oxide and the ceria metal oxide. In this regard, 'a functional layer for a solid oxide fuel cell' is a layer that is interposed between an electrolyte layer and a cathode to prevent or suppress a reaction between the electrolyte layer and the cathode. The term 'composite' as used herein refers to a material made from two or more constituent materials having different physical or chemical properties which remain separate and distinct at the macroscopic or microscopic scale within the finished structure.

While not wanting to be bound by theory, it is believed that the lanthanum metal oxide acts as an electron conductor when a solid oxide fuel cell including the lanthanum metal oxide is operated, and the lanthanum metal oxide may include an alkaline earth metal-doped lanthanum transition metal oxide. For example, the lanthanum metal oxide may include an alkaline earth metal-doped lanthanum transition metal oxide having two or more different transition metals. For example, the lanthanum metal oxide may include $LaCoO_3$ doped with Sr and Fe, and may be, for example, $La_{0.6}Sr_{0.4}Co_{0.2}Fe_{0.8}O_{3-\epsilon}$ wherein $\epsilon$ is selected so that the lanthanum metal oxide is electrically neutral.

While not wanting to be bound by theory, it is believed that the ceria metal oxide acts as an ion conductor (for example, as an oxygen ion conductor) when a solid oxide fuel cell including the ceria metal oxide is operated, and the ceria metal oxide may include at least one material selected from the group consisting of metal oxides represented by Formula 1 and metal oxides represented by Formula 2.

$$(1-a-b)(Ce_{1-x}A_xO_{2-\delta})+a(B_2O_6)+b(BO_3) \quad \text{Formula 1}$$

$$Ce_{1-x-y}A_xB_yO_{2-\gamma} \quad \text{Formula 2}$$

in which $0 \leq a \leq 0.01$, $0 \leq b \leq 0.02$, $0<2a+b\leq 0.02$, $0<x<0.3$, $0<y\leq 0.02$, $\delta$ and $\gamma$ are selected so that the metal oxides of Formulas 1 and 2, respectively, are both electrically neutral, A is a rare earth metal, and B is a 5-valent metal or a 6-valent metal.

In an embodiment, $0 \leq a \leq 0.008$, specifically $0 \leq a \leq 0.006$, more specifically $0 \leq a \leq 0.001$. In an embodiment, $0<2a+b \leq 0.01$, specifically $0<2a+b \leq 0.005$, more specifically $0<2a+b \leq 0.001$. In an embodiment $0<x<0.2$, specifically $0<x<0.15$, more specifically $0<x<0.1$. Also, in an embodiment, $0<y \leq 0.015$, specifically $0<y \leq 0.01$, more specifically $0<y \leq 0.005$.

A is a rare earth metal that has a lower oxidation state than $Ce^{4+}$ and forms an oxygen vacancy in the ceria metal oxides of Formulas 1 and 2 to provide oxygen ion conductivity to the ceria metal oxide. A may be lanthanum (La), neodymium (Nd), samarium (Sm), gadolinium (Gd), or yttrium (Y), or a combination comprising at least one of the foregoing. If x in Formulas 1 and 2 is within the range described above, the ceria metal oxide may have sufficient oxygen ion conductivity.

B is a 5-valent metal or a 6-valent metal which has a higher oxidation state than $Ce^{4+}$. While not wanting to be bound by theory, it is believed that B substantially prevents agglomeration of the ceria metal oxide particles when the ceria metal oxides of Formulas 1 and 2 are manufactured at a high temperature, and thus B increases the size of a triple phase boundary ("TPB") (see FIG. 2) of the material (i.e., a composite including the lanthanum metal oxide and the ceria metal oxide), thereby maintaining oxygen ion conductivity of the material at a high level even at a temperature equal to or lower than about 800° C. and reducing electrical resistance of the material. The term 'triple phase boundary' as used herein refers to a point or region where oxygen, the lanthanum metal oxide, and the ceria metal oxide simultaneously contact each other.

While not wanting to be bound by theory, it is believed that in Formula 1, if a and b are within the ranges described above, respectively, the size of the triple phase boundary in the material may be increased and thus the oxygen ion conductivity of the material may be improved. Likewise, if in Formula 2, y is within the range described above, the size of the triple phase boundary in the material may be increased and thus the oxygen ion conductivity of the material may be improved.

$\delta$ and $\gamma$ may be selected according to an oxidation state of A and/or B so that the metal oxides of Formulas 1 and 2, respectively, are both electrically neutral. For example, in Formula 1, if the oxidation state of A is +3, $\delta$ may be selected to be x/2. As another example, in Formula 2, if the oxidation state of A is +3 and the oxidation state of B is +5, y may be selected to be (x−y)/2. As another example, in Formula 2, if the oxidation state of A is +3 and the oxidation state of B is +6, y may be (x−2y)/2.

The amount of the lanthanum metal oxide having a perovskite-type crystal structure may be in a range of about 20 to about 80 parts by weight, specifically about 30 to about 70 parts by weight, more specifically about 40 to about 60 parts by weight, based on 100 parts by weight of the final ceria metal oxide. If the amount of the lanthanum metal oxide is within the range described above, the material for a solid oxide fuel cell may have excellent electron conductivity and excellent ion conductivity.

Hereinafter, a method of preparing a material for a solid oxide fuel cell will be described in further detail.

A method of preparing a material for a solid oxide fuel cell, according to an embodiment, includes contacting (e.g., wet-mixing) a rare earth metal-doped cerium oxide (also referred to as a first metal oxide), an oxide of a 5-valent metal or a 6-valent metal (also referred to as a second metal oxide), and a solvent to form a wet mixture, firstly heat treating the wet mixture to obtain a final ceria metal oxide, and contacting (e.g., mixing) the final ceria metal oxide and a lanthanum metal oxide with a perovskite-type crystal structure.

The method may further include adding an organic vehicle to the mixture of the final ceria metal oxide and the lanthanum metal oxide with a perovskite-type crystal structure to prepare a slurry, and coating the slurry on an electrolyte layer (see electrolyte layer 11 of FIG. 1) or a first functional layer (see first functional layer 12 of FIG. 1), which will be further described below, and then secondly heat treating the slurry. The organic vehicle may provide workability to the coating of slurry (for example, so that the slurry may be disposed by screen printing or dipping), and may further include a resin, a solvent, or a combination comprising at least one of the foregoing. The resin may act as a temporary binding agent that allows the slurry to retain a form of a layer after the coating and before the heat treatment of the slurry, and the solvent may affects a viscosity or a printability of the slurry. The resin may include at least one of polyvinylalcohol ('PVA"), polyvinylpyrrolidone ("PVP"), cellulose, or a combination comprising at least one of the foregoing. The solvent may include at least one of ethyleneglycol or alpha-terpineol.

The contacting (e.g., wet-mixing) of the first metal oxide, the second metal oxide, and the solvent may include firstly mixing the first metal oxide and the second metal oxide and secondly wet-mixing the mixture of the first and second metal oxides with the solvent.

The rare earth metal may be La, Nd, Sm, Gd, or Y, or a combination comprising at least one of the foregoing.

The 5-valent metal may be tantalum (Ta), niobium (Nb), vanadium (V), or a combination comprising at least one of the foregoing, and the 6-valent metal may include tungsten (W).

A detailed description of the lanthanum-based metal oxide has already been presented above as a material for a solid oxide fuel cell and thus will not be repeated for clarity.

The method may further include drying the wet mixture before the first heat treatment is performed. The drying may be performed at a temperature and for a time sufficient to remove the solvent.

The first heat treatment may be performed at a temperature of about 500 to about 1300° C., specifically at about 600 to about 1200° C., more specifically at about 700 to about 1100° C., for about 1 to about 10 hours, specifically about 1.5 to about 9 hours, more specifically about 2 to about 8 hours. If the first heat treatment temperature and the first heat treatment time are within the ranges described above, respectively, the final ceria metal oxide may have a high specific surface area, even without over-sintering.

The second heat treatment may be performed at a temperature of about 800 to about 1300° C., specifically at about 850 to about 1250° C., more specifically at about 900 to about 1200° C., for about 1 to about 10 hours, specifically about 1.5 to about 9 hours, more specifically about 2 to about 8 hours. If the second heat treatment temperature and the second heat treatment time are within the ranges described above, respectively, the material may retain a high reaction area (for example, a large triple phase boundary area) without formation of a secondary phase and may have an excellent adhesion property with respect to a substrate (electrolyte layer or first functional layer). The term 'secondary phase' refers to a material that is generated by chemical reaction of the final ceria metal oxide and the lanthanum metal oxide.

Hereinafter, with reference to the attached drawings, a cathode for a solid oxide fuel cell, and a solid oxide fuel cell including the cathode will be described in further detail.

Figure 2:
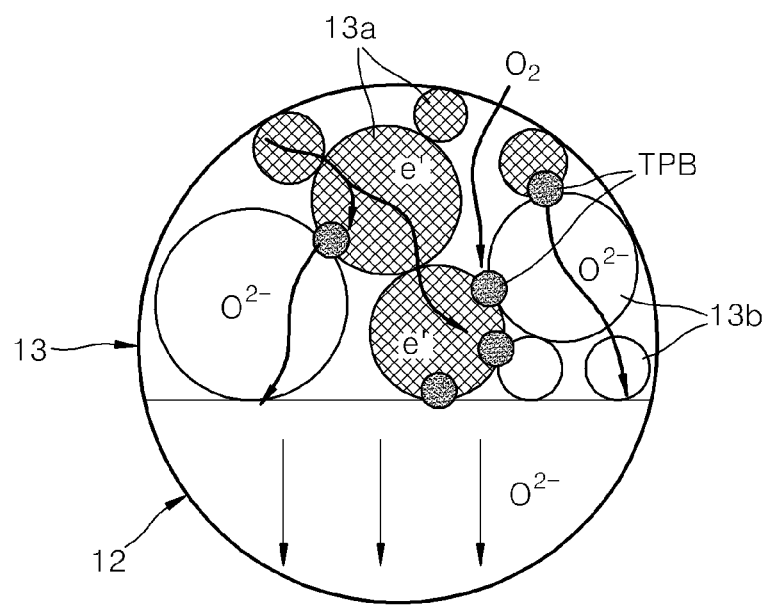
FIG. 2 is a conceptual view of a triple phase boundary in the layer of the material illustrated in FIG. 1.

FIG. 1 is a cross-sectional view of an embodiment of a half cell 10 including a cathode material layer 13, and FIG. 2 is a conceptual view of a triple phase boundary ("TPB") in the cathode material layer 13 of FIG. 1 when the half cell is operated.

The half cell 10 may include an electrolyte layer 11, a first functional layer 12, and a cathode material layer 13.

The electrolyte layer 11 may include at least one of scandia-stabilized zirconia ("ScSZ"), yttria-stabilized zirconia ("YSZ"), samarium doped ceria ("SDC"), gadolinium doped ceria ("GDC"), or a combination comprising at least one of the foregoing.

While not wanting to be bound by theory, it is believed that the first functional layer 12 may prevent or suppress a reaction between the electrolyte layer 11 and the cathode material layer 13 to form a non-conductive layer (not shown) therebetween. The first functional layer 12 may include at least one of gadolinium doped ceria ("GDC"), samarium doped ceria ("SDC"), or yttrium doped ceria ("YDC"), or a combination comprising at least one of the foregoing.

The cathode material layer 13 may include the lanthanum metal oxide (also referred to as an electron conductor) with a perovskite-type crystal structure and the ceria metal oxide (also referred to as an ion conductor). In the present embodiment, the cathode material layer 13 may constitute a cathode.

In a solid oxide fuel cell (not shown) including the half cell 10 having the constitution as described above and an anode (not shown), a triple phase boundary (see TPB of FIG. 2) present in the cathode material layer 13 is very large. Therefore, even when the solid oxide fuel cell is operated at a temperature of 800° C. or less (for example, 600° C.), a low cathode resistance may be provided. More specifically, in the triple phase boundary, oxygen is reduced ($\frac{1}{2}O_2 + 2e^- \rightarrow O^{2-}$) and the effective rate of oxygen reduction is increased as the size of the triple phase boundary is increased. In addition, if the effective rate of oxygen reduction is increased, more oxygen ions $O^{2-}$ are generated, the oxygen ion conductivity of the cathode material layer 13 may be increased, and a cathode resistance may be decreased.

Referring to FIG. 2, the triple phase boundary is a point or region where an electron conductor 13a, an ion conductor 13b, and oxygen simultaneously contact each other, and in the triple phase boundary an electron e' that enters from an anode (not shown) through the electron conductor 13a reacts with oxygen to reduce the oxygen, and the generated oxygen ion $O^{2-}$ flows to the anode through the ion conductor 13b, the first functional layer 12, and the electrolyte layer (see electrolyte layer 11 of FIG. 1).

Figure 3:
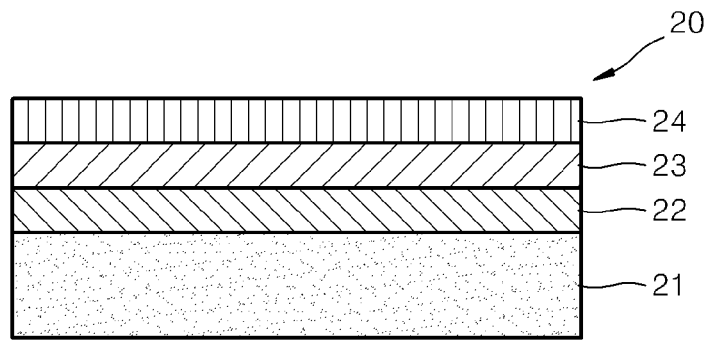
FIG. 3 is a cross-sectional view of an embodiment of a half cell including a layer of a material according to another embodiment.

FIG. 3 is a cross-sectional view of an embodiment of a half cell 20 including a cathode material layer 23 according to another embodiment.

The half cell 20 includes an electrolyte layer 21, a first functional layer 22, the cathode material layer 23, and an additional layer 24. In the present embodiment, the cathode material layer 23 and the additional layer 24 constitute a cathode. However, a half cell or a solid oxide fuel cell, each of which may include a cathode having a multi-layer structure of a variety of structures or layers, may also be provided.

The electrolyte layer 21, the first functional layer 22, and the cathode material layer 23 may have the same structure and function as the electrolyte layer 11, the first functional layer 12, and the cathode material layer 13, respectively, which are described above.

The additional layer 24 may include a lanthanum metal oxide with a perovskite-type crystal structure. The lanthanum metal oxide included in the additional layer 24 may be the same as the lanthanum metal oxide included in the cathode material layer 23.

The anode may include a cermet in which a material that forms the electrolyte layer 11 or 21 is combined with nickel oxide. The material that forms the electrolyte layer 11 or 21 may be in the form of a powder. In addition, the anode may additionally include activated carbon.

According to another embodiment, although not illustrated in the drawings, a solid oxide fuel cell may include the electrolyte layer as described above, a second functional layer including the material for a solid oxide fuel cell as described above, and a cathode. The second functional layer may be interposed between the electrolyte layer and the cathode to prevent or suppress a reaction therebetween. The cathode may include a lanthanum metal oxide, such as $La_{0.6}Sr_{0.4}Co_{0.2}Fe_{0.8}O_{3-\epsilon}$ wherein $\epsilon$ is selected so that the lanthanum metal oxide is electrically neutral, and/or a barium metal oxide such as $Ba_{0.5}Sr_{0.5}Co_{0.8}Fe_{0.2}O_{3-\lambda}$ wherein $\lambda$ is selected so that the barium metal oxide is electrically neutral, but does not include the ceria metal oxide of Formula 1 or the ceria metal oxide of Formula 2.

Hereinafter, an embodiment will be disclosed in further detail with reference to the following examples. These examples are not intended to limit the purpose and scope of the disclosed embodiments.

EXAMPLES

Comparative Example 1

Figure 4:
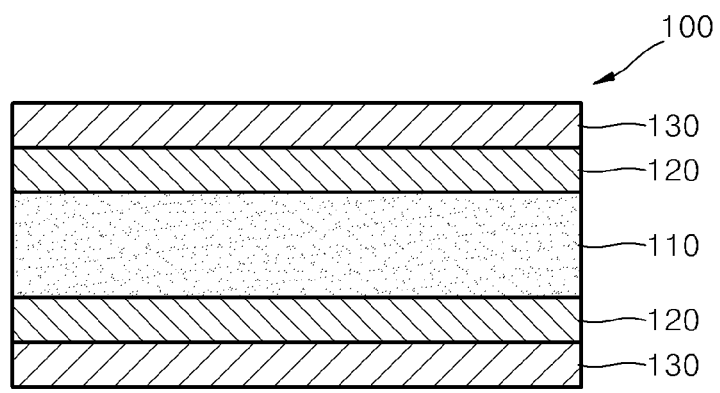
FIG. 4 is a cross-sectional view of a test cell manufactured according to Comparative Example 1.

A test cell 100 with a structure as shown in FIG. 4 was manufactured. The test cell 100 includes an electrolyte layer 110, a pair of first functional layers 120, and a pair of cathode material layers 130.

Material Used to Form Electrolyte Layer 110

The material used to form the electrolyte layer 110 is a scandia-stabilized zirconia ("ScSZ") having the formula $Zr_{0.8}Sc_{0.2}O_{2-\zeta}$ wherein $\zeta$ is selected so that the ScSZ is electrically neutral. The ScSZ was sourced from Fuel Cell Materials ("FCM"), USA.

Material Used to Form First Functional Layer 120

The material used to form the first functional layer 120 is a gadolinium doped ceria ("GDC") having the formula $Ce_{0.9}Gd_{0.1}O_{2-\eta}$ wherein $\eta$ is selected so that the GDC is electrically neutral. The GDC was sourced from Fuel Cell Materials ("FCM"), USA.

Material Used to Form Cathode Material Layer 130

The material used to form the cathode material layer 130 is a lanthanum metal oxide represented by $La_{0.6}Sr_{0.4}Co_{0.2}Fe_{0.8}O_{3-\epsilon}$ wherein $\epsilon$ is selected so that the lanthanum metal oxide is electrically neutral. The lanthanum metal oxide ("LSCF") was sourced from Fuel Cell Materials ("FCM"), USA.

Comparative Example 2

Figure 5:
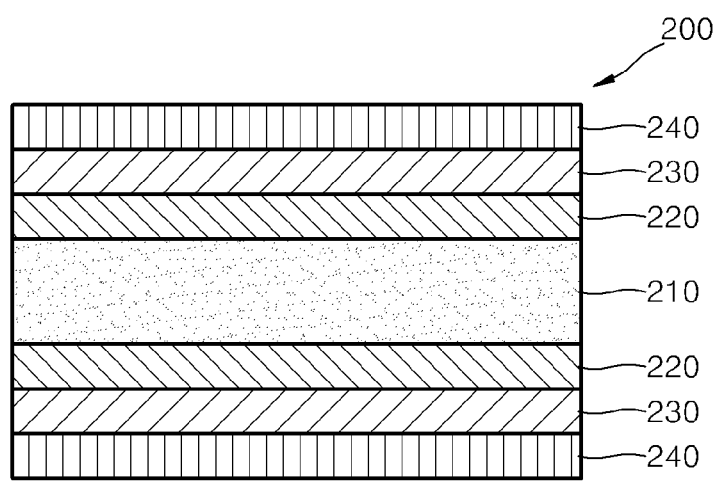
FIG. 5 is a cross-sectional view of test cells manufactured according to Comparative Examples 2 and 3 and Examples 1 and 2.

A test cell 200 with a structure as shown in FIG. 5 was manufactured. The test cell 200 includes an electrolyte layer 210, a pair of first functional layers 220, a pair of cathode material layers 230, and a pair of additional layers 240.

Material Used to Form Electrolyte Layer 210

The material used to form the electrolyte layer 210 is a scandia-stabilized zirconia ("ScSZ") having the formula $Zr_{0.8}Sc_{0.2}O_{2-\zeta}$ wherein $\zeta$ is selected so that the zirconium metal oxide is electrically neutral. The zirconium-based metal oxide was sourced from Fuel Cell Materials ("FCM"), USA.

Material Used to Form First Functional Layers 220

The material used to form the first functional layers 220 is a gadolinium doped ceria ("GDC") having the formula $Ce_{0.9}Gd_{0.1}O_{2-\eta}$ wherein $\eta$ is selected so that the GDC is electrically neutral. The ceria metal oxide was sourced from Fuel Cell Materials ("FCM"), USA.

Manufacture of Cathode Material Layers 230

The cathode material layers 230 were manufactured by using the following method.

(1) Manufacture of Ceria Metal Oxide

A gadolinium doped ceria ("GDC") having the formula $Ce_{0.9}Gd_{0.1}O_{2-\eta}$ wherein $\eta$ is selected so that the GDC is electrically neutral, sourced from FCM, USA, was dried at a temperature of 60° C. for 12 hours, and then heat treated at 1,000° C. for 2 hours to produce a heat treated GDC.

(2) Manufacture of Cathode Material Slurry

The heat treated GDC was mixed with $La_{0.6}Sr_{0.4}Co_{0.2}Fe_{0.8}O_{3-\epsilon}$ wherein $\epsilon$ is selected so that the lanthanum metal oxide is electrically neutral, sourced from FCM, USA, in a weight ratio of 1:1. Then, 0.2 gram (g) of organic vehicle (Ink Vehicle, VEH, sourced from FCM, USA) was added to 0.3 g of the mixture, thereby preparing a cathode material slurry.

(3) Coating and Heat Treating of Cathode Material Slurry

The cathode material slurry was coated on each of the first functional layers 220 by screen printing. Then, the coated slurry was heat treated at a temperature of 1,200° C. for 2 hours and at a temperature of 1,000° C. for 2 hours.

Material Used to Form Additional Layers 240

The material used to form the additional layers 240 is a lanthanum metal oxide having the formula $La_{0.6}Sr_{0.4}Co_{0.2}Fe_{0.8}O_{3-\epsilon}$ wherein $\epsilon$ is selected so that the lanthanum metal oxide is electrically neutral, sourced from FCM, USA.

Comparative Example 3 and Examples 1 and 2

Test cells 200 were manufactured in the same manner as in Comparative Example 2, except that the ceria metal oxide was prepared by using the following method when the cathode material layers 230 were formed.

Manufacture of Ceria Metal Oxide

A gadolinium doped ceria ("GDC") having the formula $Ce_{0.9}Gd_{0.1}O_{2-\eta}$ wherein $\eta$ is selected so that the ceria metal oxide is electrically neutral, sourced from FCM, USA, was mixed with a metal oxide as shown in Table 1. Then, 10 milliliters (mL) of ethanol was added to 5 g of the mixture and wet mixed. Then, the wet mixture was dried at a temperature of 60° C. for 12 hours and then heat treated at a temperature of 1,000° C. for 2 hours, thereby preparing a metal-doped GDC.

TABLE 1

|  | Comparative Example 3 | Example 1 | Example 2 |
|---|---|---|---|
| Metal oxide | ZnO | $Nb_2O_5$ | $Ta_2O_5$ |
| GDC:metal oxide (mole ratio) | 1:0.005 | 1:0.005 | 1:0.005 |

EVALUATION EXAMPLES

Evaluation Example 1

Impedance Measurement in Air Atmosphere

Figure 6:
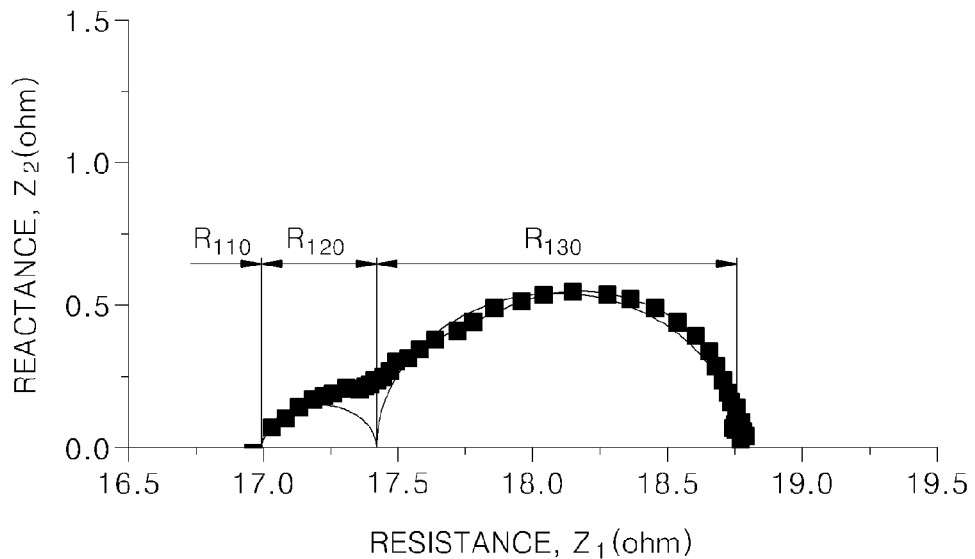
FIG. 6 is a graph of reactance ($Z_2$, ohms) versus resistance ($Z_1$, ohms) showing impedance results measured in an air atmosphere of a test cell manufactured according to Comparative Example 1.

Impedance of the test cell 100 prepared according to Comparative Example 1 was measured in an air atmosphere, and the results are shown in FIG. 6. Materials Mates 7260 impedance meter manufactured by Materials Mates Inc. was used. An operating temperature of the test cell 100 was maintained at 600° C.

In FIG. 6, $Z_1$ represents a resistance, and $Z_2$ represents a reactance. $R_{110}$ represents a resistance of the electrolyte layer 110 because a corresponding reactance value is 0. In addition, as to be discussed in Evaluation Example 2, $R_{120}$ represents a resistance of the first functional layer 120, and $R_{130}$ represents a resistance of the cathode material layer 130. $R_{120}$ and $R_{130}$ were obtained by curve fitting the impedance data of FIG. 6 as shown by solid lines in FIG. 6.

Evaluation Example 2

Impedance Measurement with Respect to Oxygen Partial Pressure

Figure 7:
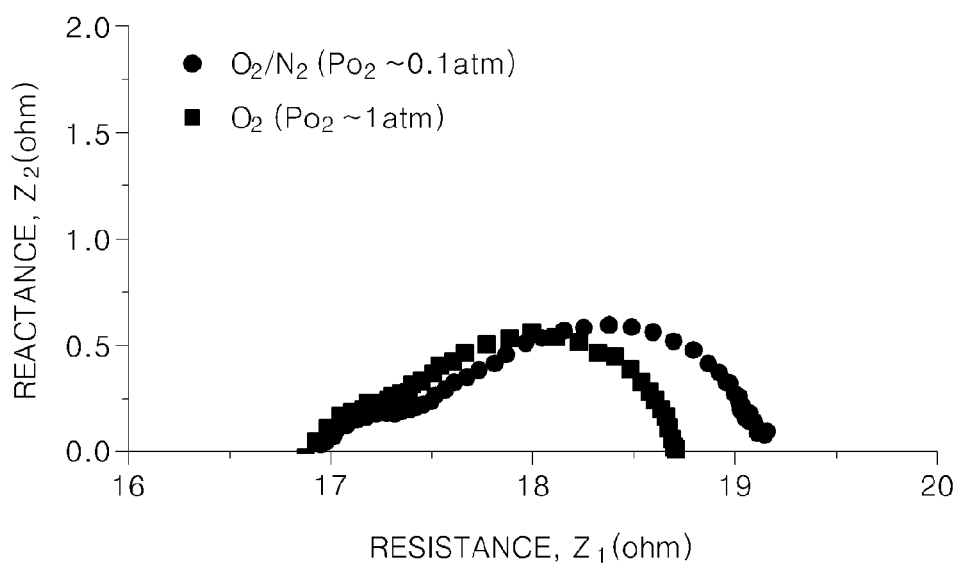
FIG. 7 is a graph of reactance ($Z_2$, ohms) versus resistance ($Z_1$, ohms) showing impedance results with respect to an oxygen partial pressure of a test cell manufactured according to Comparative Example 1.

In order to identify layers of the test cell 100 respectively corresponding to $R_{120}$ and $R_{130}$ in FIG. 6, the impedance of the test cell 100 was measured while changing the oxygen partial pressure, and the results are shown in FIG. 7. The impedance meter used in this experiment and an operating temperature of the test cell 100 were the same as in Evaluation Example 1.

Referring to FIG. 7, of the resistances shown in FIG. 7, a resistance corresponding to $R_{120}$ of FIG. 6 barely changed when the oxygen partial pressure was changed, specifically $P_{O2}$ was changed from 0.1 to 1 atmosphere ("atm"), and a resistance corresponding to $R_{130}$ of FIG. 6 was reduced when $P_{O2}$ was changed from 0.1 to 1 atm when the oxygen partial pressure was increased. From such results, it can be confirmed that of the resistances of FIG. 7, the resistance corresponding to $R_{120}$ of FIG. 6 is a resistance of the first functional layer 120 that does not directly contact the air, and the resistance corresponding to $R_{130}$ of FIG. 6 is a resistance of the cathode material layer 130 that directly contacts the air. In addition, because the total resistance $R_t$ of the test cell 100, except for the resistance of the electrolyte layer 110, is the sum of the resistance of the first functional layer 120 and the resistance of the cathode material layer 130, and the resistance of the cathode material layer 130 is much greater than the resistance of the first functional layer 120, in order to reduce the total resistance $R_t$ of the test cell 100, the resistance of the cathode material layer 130 is desirably reduced.

Evaluation Example 3

Resistance Measurement with Respect to Oxygen Partial Pressure

The impedance of the test cell 100 was measured as in Evaluation Example 2 under various oxygen partial pressures. The resistance $R_{120}$ of the first functional layer 120 and the resistance $R_{130}$ of the cathode material layer 130, which were obtained by curve-fitting the impedance data, are shown with respect to oxygen partial pressure in FIG. 8. In this regard, reproducibility tests were also preformed under the same conditions.

Figure 8:
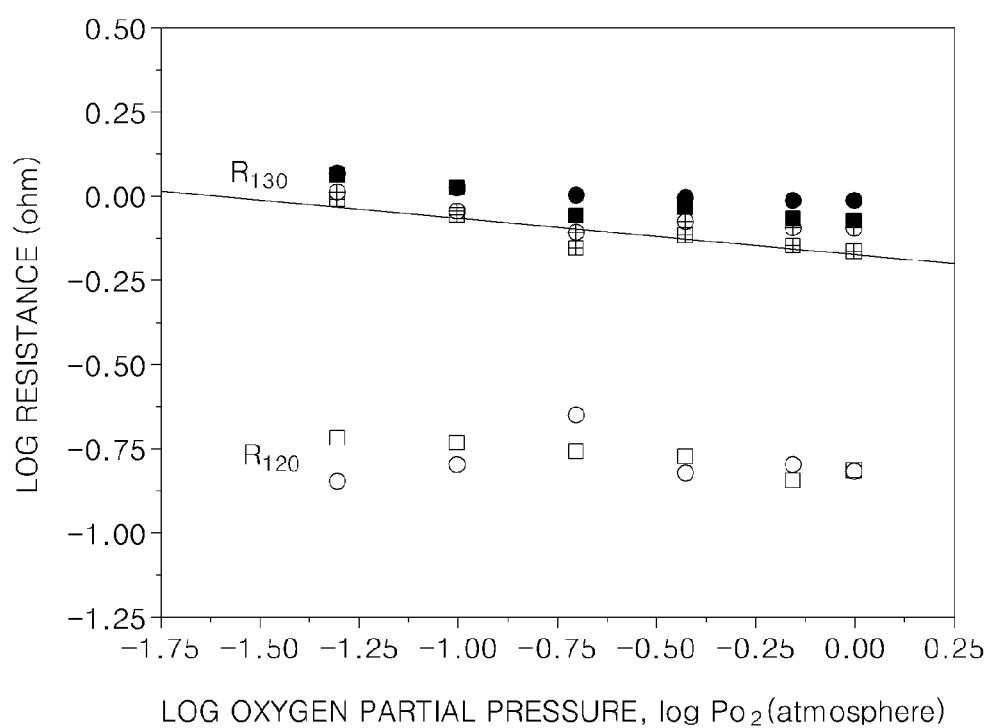
FIG. 8 is a graph of log resistance (ohms) versus the log of oxygen partial pressure (atmospheres) showing resistance values with respect to an oxygen partial pressure of a test cell manufactured according to Comparative Example 1.

Referring to FIG. 8, $R_{120}$ is independent from the oxygen partial pressure, and $R_{130}$ is dependent on the oxygen partial pressure. These results are essentially the same as the results of Evaluation Example 2. In addition, if a curve is fitted to the $R_{130}$ results in FIG. 8, a straight line is obtained. While not wanting to be bound by theory, it is believed that this means that $R_{130}$ is correlated to the oxygen partial pressure. In addition, it was confirmed by repeating these experiments that the experimental data is reproducible.

Evaluation Example 4

Impedance Measurement in Air Atmosphere

Figure 9:
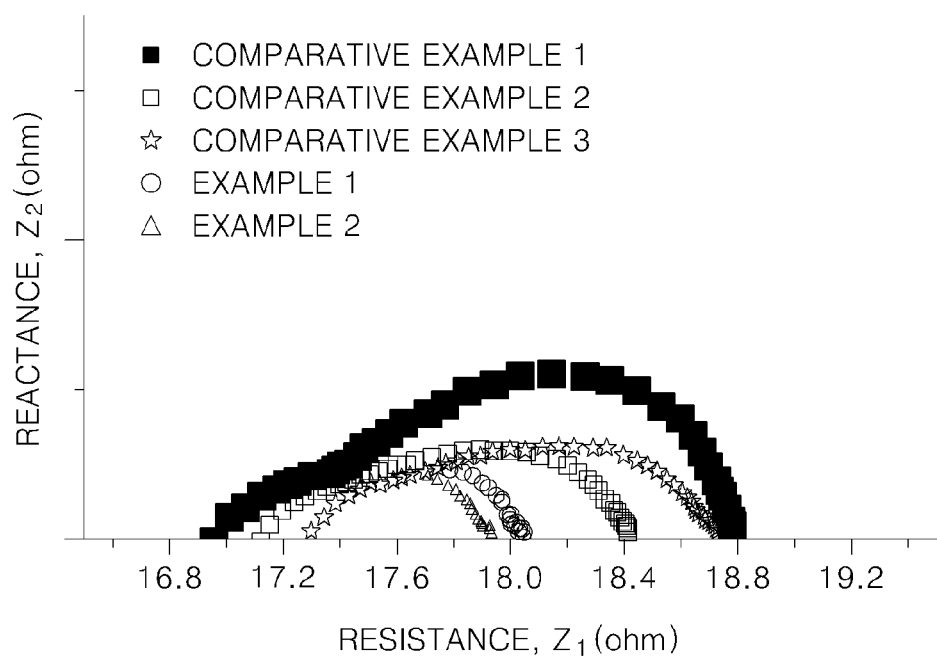
FIG. 9 is a graph of reactance ($Z_2$, ohms) versus resistance ($Z_1$, ohms) showing impedance results measured in an air atmosphere of test cells manufactured according to Comparative Examples 1 through 3 and Examples 1 and 2.

The impedance of the test cell 100 manufactured according to Comparative Example 1 and the impedance of each of the test cells 200 manufactured according to Comparative Examples 2 and 3 and Examples 1 and 2 were measured in an air atmosphere, and the results are shown in FIG. 9. The impedance meter used in this experiment and operating temperatures of the test cells 100 and 200 were the same as in Evaluation Example 1.

Referring to FIG. 9, it was confirmed that the total resistance of the test cells 200 manufactured according to Examples 1 and 2 were smaller than the total resistance of the test cell 100 manufactured according to Comparative Example 1 and the total resistance of each of the test cells 200 manufactured according to Comparative Examples 2 and 3. While not wanting to be bound by theory, it is believed that these results are because each of the test cells 200 manufactured according to Examples 1 and 2 include the cathode material layer 230 having a large triple phase boundary, a reaction rate (i.e., an oxygen reduction reaction rate) is greater than that of the test cell 100 manufactured according to Comparative Example 1 and the test cells 200 manufactured according to Comparative Examples 2 and 3, and thus oxygen ion conductivity thereof is improved, and thereby, a cathode resistance (i.e., the sum of a resistance of the cathode material layer 230 and a resistance of the additional layer 240) is reduced. In this regard, the total resistance of each test cell 200 is obtained by curve-fitting impedance data, and is a $Z_1$ coordinate at a right most point lying on the horizontal axis.

Evaluation Example 5

Impedance Measurement According to Operating Temperature

The impedance of each test cell 100 manufactured according to Comparative Example 1 and of each of the test cells 200 manufactured according to Comparative Examples 2 and 3 and Examples 1 and 2 were measured in an air atmosphere at various operating temperatures. The impedance meter was the same as used in Evaluation Example 1. The total resistance $R_t$ of test cells 100 and 200 was obtained by curve-fitting impedance results with respect to operating temperature, and is shown in FIG. 10.

Figure 10:
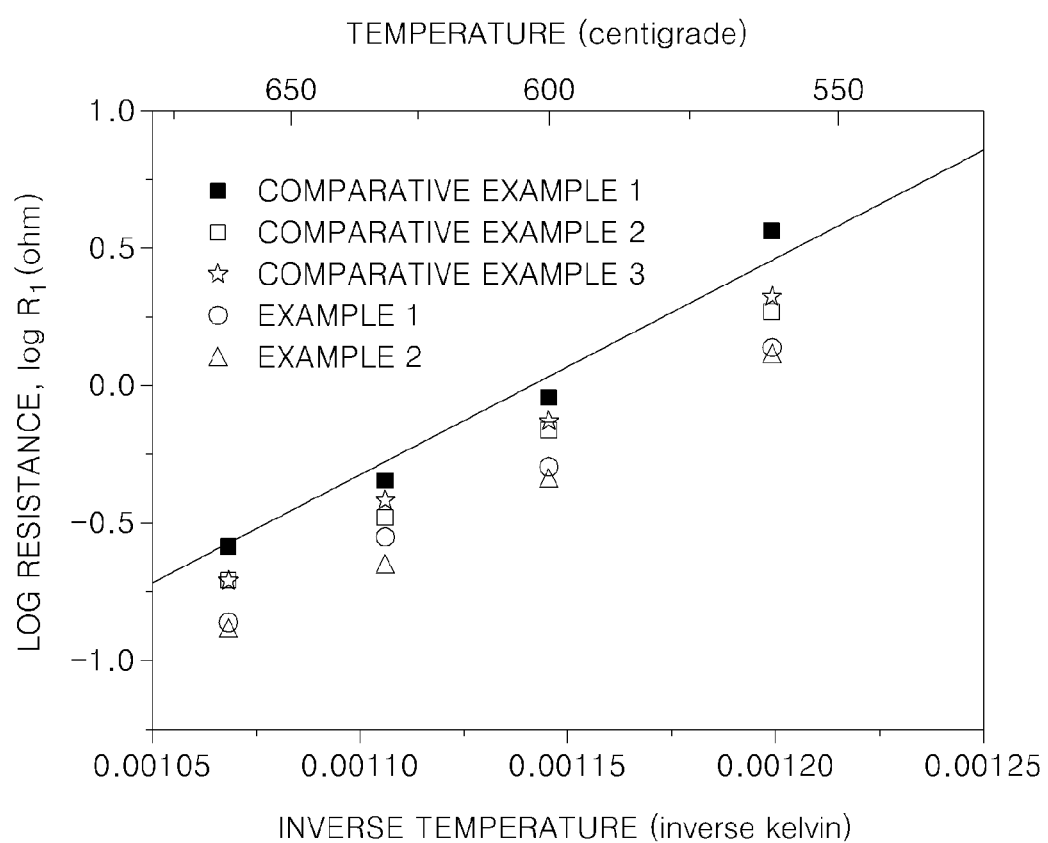
FIG. 10 is a graph of log resistance (ohms) versus inverse temperature (inverse Kelvin) showing resistance values with respect to an operating temperature of test cells manufactured according to Comparative Examples 1 through 3 and Examples 1 and 2.

Referring to FIG. 10, independent from the operating temperature, the total resistances $R_t$ of test cells 200 manufactured according to Examples 1 and 2 are each less than the total resistance $R_t$ of the test cell 100 manufactured according to Comparative Example 1 and the total resistance $R_t$ of the test cells 200 manufactured according to Comparative Examples 2 and 3. In addition, as the operating temperature is reduced, the total resistance $R_t$ is increased.

In a material for a solid oxide fuel cell, by including a ceria ion conductor including a 5-valent metal and/or a 6-valent metal, and a lanthanum electron conductor, a specific surface area of the ion conductor and a size of a triple phase boundary at which a cathode reaction occurs are increased, and thus even at a temperature equal to or lower than 800° C., a low electrical resistance is maintained.

According to another embodiment, a cathode for a solid oxide fuel cell, in which the cathode includes the material, is provided.

According to another embodiment, a solid oxide fuel cell that is operable at a temperature equal to or lower than 800° C. is provided.

It should be understood that the exemplary embodiments described herein should be considered in a descriptive sense only and not for purposes of limitation. Descriptions of features, advantages, or aspects of each embodiment should be considered as available for other similar features or aspects in other embodiments.

What is claimed is:

1. A material for a solid oxide fuel cell, the material comprising:
   a lanthanum metal oxide having a perovskite-type crystal structure; and
   a ceria metal oxide,
   wherein the ceria metal oxide comprises at least one material selected from the group consisting of metal oxides represented by Formula 1 below and metal oxides represented by Formula 2 below:

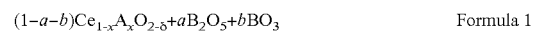

$(1-a-b)Ce_{1-x}A_xO_{2-\delta}+aB_2O_5+bBO_3$  Formula 1

$Ce_{1-x-y}A_xB_yO_{2-\gamma}$  Formula 2 wherein
   $0 \leq a \leq 0.01$, $0 \leq b \leq 0.02$, $0 < 2a+b \leq 0.02$, $0 < x < 0.3$, $0 < y \leq 0.02$,
   δ and γ are selected so that the metal oxides of Formulas 1 and 2, respectively, are both electrically neutral,
   A is a rare earth metal, and
   B is a 5-valent metal or a 6-valent metal.

2. The material of claim 1, wherein the lanthanum metal oxide comprises a lanthanum transition metal oxide doped with an alkaline earth metal.

3. The material of claim 2, wherein the alkaline earth metal-doped lanthanum transition metal oxide comprises two or more different transition metals.

4. The material of claim 3, wherein the lanthanum metal oxide comprises strontium- and iron-doped $LaCoO_3$.

5. The material of claim 1, wherein A is lanthanum, neodymium, samarium, gadolinium, or yttrium, or a combination comprising at least one of the foregoing.

6. The material of claim 1, wherein B is tantalum, niobium, vanadium, or tungsten, or a combination comprising at least one of the foregoing.

7. The material of claim 1, wherein an amount of the lanthanum metal oxide having a perovskite-type crystal structure is in a range of about 20 to about 80 parts by weight, based on 100 parts by weight of the ceria metal oxide.

8. A cathode for a solid oxide fuel cell, the cathode comprising the material of claim 1.

9. The cathode of claim 8, wherein the cathode has a multi-layer structure comprising:
   the material of claim 1, and
   an additional layer,
   wherein the additional layer comprises a lanthanum metal oxide having a perovskite-type crystal structure.

10. A solid oxide fuel cell comprising:
    the cathode of claim 8;
    an anode; and an electrolyte interposed between the cathode and the anode.

11. The solid oxide fuel cell of claim 10, further comprising:
a first functional layer disposed between the cathode and the electrolyte,
wherein the first functional layer prevents or suppresses a reaction between the cathode and the electrolyte.

12. The solid oxide fuel cell of claim 11, wherein the first functional layer comprises at least one material selected from the group consisting of gadolinium doped ceria, samarium doped ceria, and yttrium doped ceria.

13. A solid oxide fuel cell comprising:
a cathode;
an anode;
an electrolyte interposed between the cathode and the anode; and
a second functional layer which is interposed between the cathode and the electrolyte,
wherein the second functional layer comprises the material of claim 1.

14. The solid oxide fuel cell of claim 13, wherein the cathode comprises at least one material selected from the group consisting of lanthanum metal oxides and barium metal oxides.

* * * * *